United States Patent [19] [11] 4,068,993

Dacey et al. [45] Jan. 17, 1978

[54] APPARATUS FOR MOULDING CONFECTIONERY

[75] Inventors: Raymond Gwilym Dacey, Hemel Hempstead; Richard Hugh Verity, Ampthill, both of England

[73] Assignee: Baker Perkins Holdings Limited, England

[21] Appl. No.: 608,685

[22] Filed: Aug. 28, 1975

[30] Foreign Application Priority Data

Aug. 30, 1974 United Kingdom .................. 380976

[51] Int. Cl.[2] ............................................. A23G 3/12

[52] U.S. Cl. .................................. 425/104; 425/134; 425/120; 425/371; 425/439

[58] Field of Search ............... 425/112, 130, 120, 134, 425/439, 371, 372, 812, 121, 104; 99/450.6

[56] References Cited

U.S. PATENT DOCUMENTS

| | | | |
|---|---|---|---|
| 1,475,579 | 11/1923 | Harlan | 425/134 |
| 1,515,125 | 11/1924 | Landstra | 425/812 X |
| 1,829,795 | 11/1931 | Garvin | 425/439 X |
| 2,954,596 | 10/1960 | Fassaver et al. | 425/439 X |
| 3,064,590 | 11/1962 | Thiele | 425/371 |

FOREIGN PATENT DOCUMENTS

| | | | |
|---|---|---|---|
| 376,072 | 1/1920 | Germany | 425/439 |
| 1,202,116 | 9/1965 | Germany | 425/112 |
| 1,290,359 | 9/1972 | United Kingdom | 425/134 |
| 752,478 | 7/1956 | United Kingdom | 425/120 |

*Primary Examiner*—Ronald J. Shore
*Assistant Examiner*—W. R. Briggs
*Attorney, Agent, or Firm*—Watson, Cole, Grindle & Watson

[57] ABSTRACT

A confectionery moulding machine comprising an endless mould conveyor which transverses moulds in continuous procession in an upper run in which the cavities in the moulds face upwardly and in a lower run in which the mould cavities face downwardly, a depositor for depositing liquid confectionery into the moulds in succession as they travel along the upper run, a conveyor band which travels continuously beneath the lower run of the mould conveyor, and a demoulding unit for discharging the fillings of the cavities of each mould in succession onto the conveyor band, the moulds having projections which contact the upper surface of the band on the lower run of the mould conveyor and project from the downwardly facing surfaces of the moulds on the lower run by an amount less than the depth of the mould cavities and constrain the band to run at the same speed as the mould conveyor.

6 Claims, 14 Drawing Figures

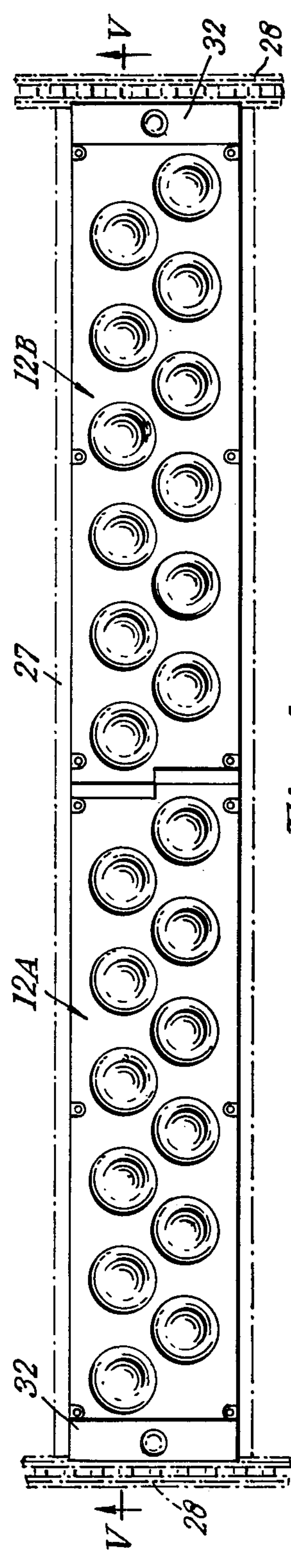
Fig. 4.
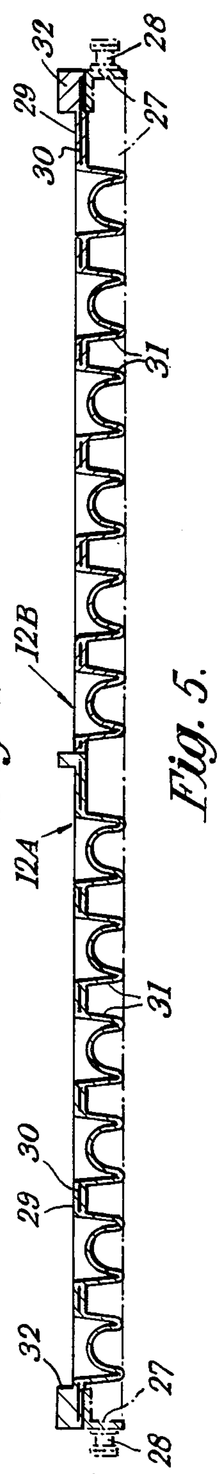
Fig. 5.
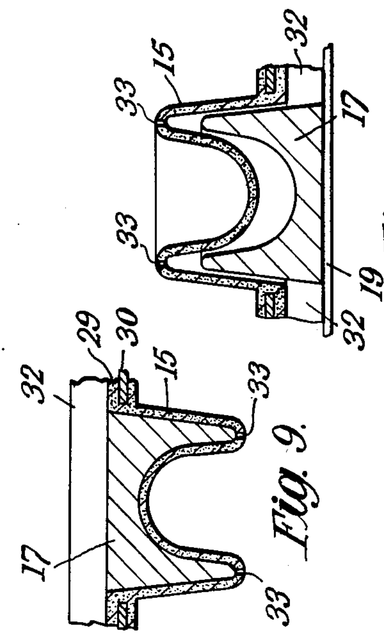
Fig. 9.
Fig. 10.
17
21
Fig. 11.
23
21
17
Fig. 12.
26
23
21
17
Fig. 13.

APPARATUS FOR MOULDING CONFECTIONERY

BACKGROUND OF THE INVENTION

This invention relates to machines for moulding confectionery of the type comprising an endless conveyor for traversing moulds in continuous procession beneath a depositor, which depositor deposits liquid confectionery into the upwardly facing moulds on the upper run of the conveyor, and a conveyor band which travels continuously beneath the downwardly facing moulds on the lower run of the conveyor to receive partially cooled products from the moulds at a demoulding station. Normally, provision is made for assisting discharge of the products from the moulds at the demoulding station. This can be achieved mechanically, by tapping the bases of the inverted moulds, or, when the moulds are of flexible material, by a fixed member which encounters and slightly deforms the bases of the moulds, or pneumatically by directing an air blast through small holes in the bases of the moulds.

It is sometimes required that the demoulded products should be conveyed to a second depositing station to receive a further deposit, for example, a different liquid confectionery, a nut or a cherry. To permit this it is necessary that the confectionery fillings of the moulds should be deposited on the band without change of orientation and in precisely the same orderly arrangement as that in which they were contained in the moulds. Loss of correct positioning can arise from premature deposit of the confectionery products from the moulds before they reach the demoulding station and from mismatch in the linear speeds of the mould conveyor and the band.

Such mismatch cannot be avoided with existing machines of the above noted type. The moulds are mounted on a chain conveyor which can be positively driven at a desired speed, but the band cannot be relied upon to travel at precisely the same speed as the chain conveyor because of slippage between the band and its driving drum.

SUMMARY OF THE INVENTION

According to the present invention, this difficulty is avoided by providing on the moulds projections which contact the upper surface of the band on the lower run of the mould conveyor and project from the then downwardly facing surfaces of the moulds by an amount less than the depth of the mould cavities. These projections assist in driving the band and constrain it to run at precisely the same speed as the mould conveyor. Moreover they maintain the moulds on the lower run at a precise spacing from the band which is sufficiently small to prevent any confectionery filling (which tends to deposit prematurely from a mould onto the band) from falling sufficiently far for it to leave its mould cavity entirely.

DESCRIPTION OF THE DRAWINGS

One embodiment of confectionery moulding machine according to the invention, and alternative forms of mould for use therein, are illustrated, by way of example, by the accompanying drawings in which:

FIG. 4 is a plan view, on a smaller scale, showing two half moulds of the construction shown in FIG. 2 fitted together;

FIG. 5 is a section on the line V — V in FIG. 4;

FIGS. 9 – 13 are diagrams illustrating successive stages in the operation of the machine.

DETAILED DESCRIPTION OF THE INVENTION

Figure 1A:
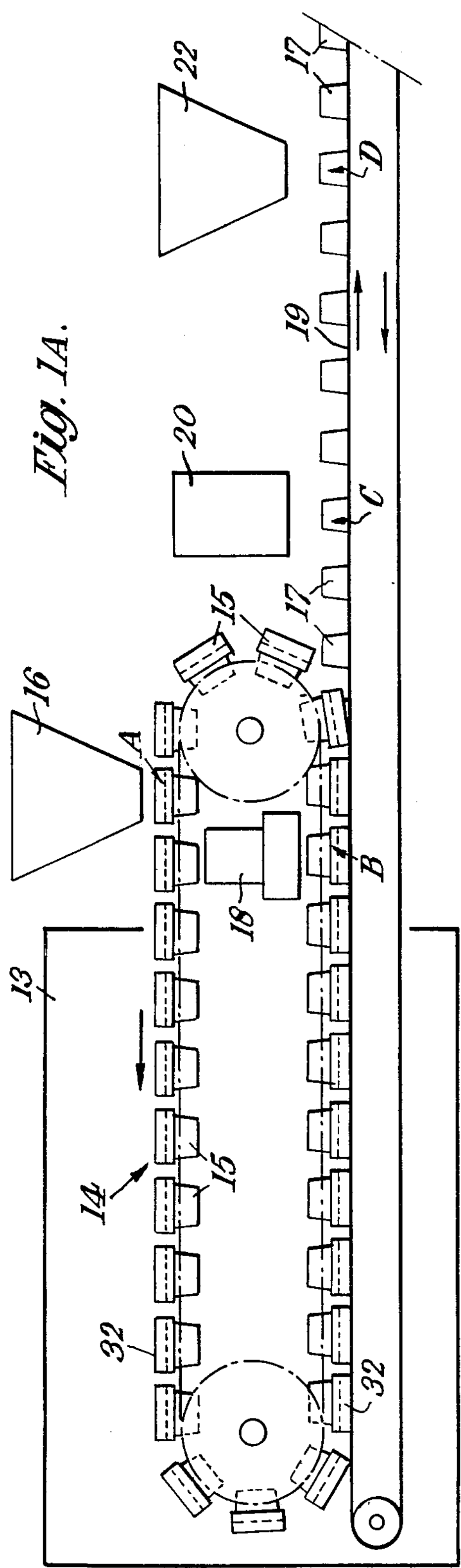
FIGS. 1A and 1B collectively constitute a diagrammatic side elevation of the machine.
Figure 1B:
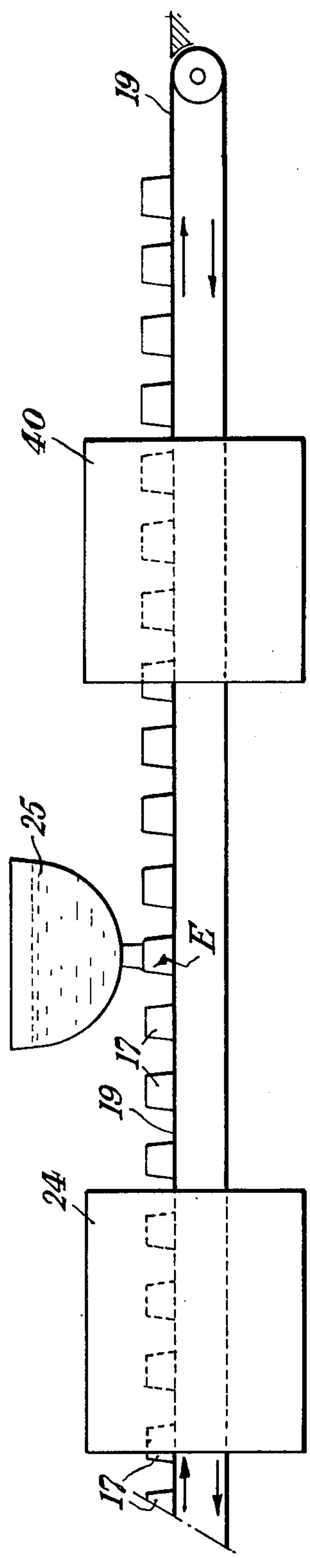
Figure 2:
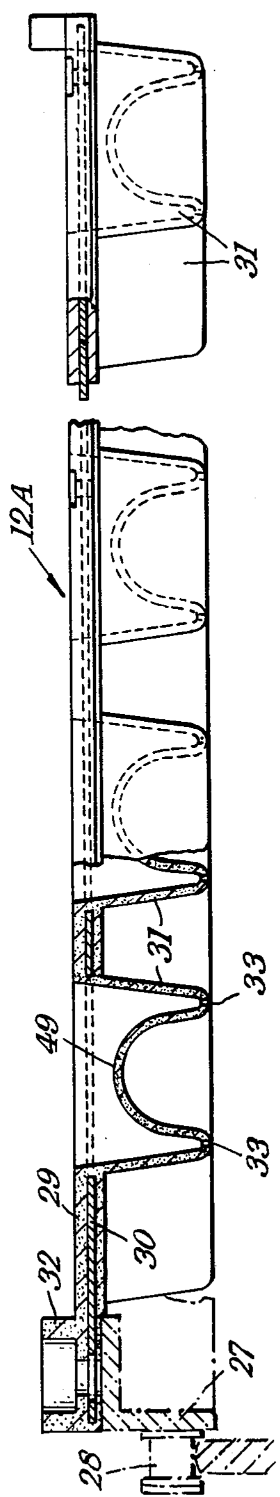
FIG. 2 is a side elevation, partly in section, showing one half of one embodiment of mould, according to the present invention
Figure 3:
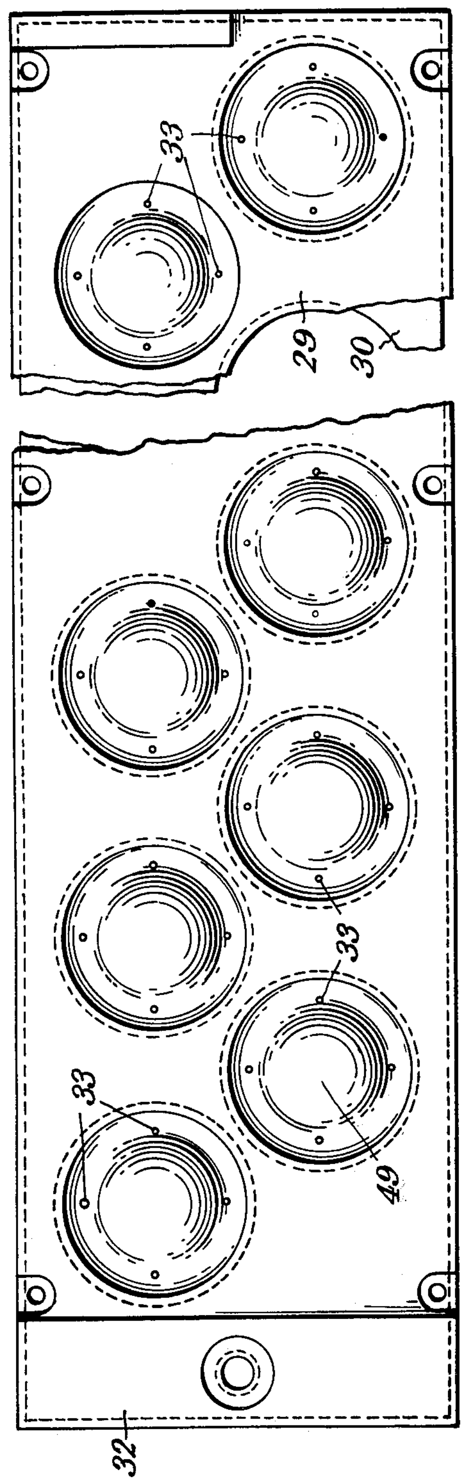
FIG. 3 is a corresponding plan view of a mould according to the present invention.

As shown in FIGS. 1A and 1B, a chain conveyor 14 traverses upwardly facing moulds 15 continuously, in the direction indicated by the arrow, beneath a moving head depositor 16 at station A. The depositor deposits in each mould 15 a first filling 17 of liquid confectionery as shown in FIG. 9, and then the molds are caused to pass through a cooling chamber 13. When, during their travel on the lower run of the conveyor 14, the downwardly facing moulds 15 reach station B, a demoulding unit 18 discharges the filling 17, which has now cooled from each mould, onto the upper run of a conveyor band 19 as shown in FIG. 10 and as described in more detail below. The demoulding unit 18 operates in the well, known manner by either tapping the bases of the moulds or by directing an air blast through small holes in the bases of the moulds.

In the machine shown in FIGS. 1A and 1B, the moulds 15 are of the configuration shown in FIGS. 2 – 5 and deposit on the band 19 cup; shaped fillings 17. As these are advanced by the band, a depositor 20 at station C deposits a nut or cherry 21 into each cup as shown in FIG. 11. Then, at station D a depositor 22 deposits a filling 23 of different confectionery into the cup as shown in FIG. 12. The cups are then traversed through a second cooling chamber 24. Beyond this at station E they are coated with chocolate 26 by a chocolate coater 25. After passage through a third cooling chamber 40 the cups are removed from the band by any conventional discharge mechanism (not shown). The depositor 16 operates in the conventional manner, being reciprocated with respect to the conveyor 14 in a deposit stroke in which it advances with the mould 15 beneath it to make a deposit in the mould, followed by a return stroke in which it moves into the position above the next succeeding mould. The depositors 20, 22 move in a similar fashion with respect to the fillings 17 on the band 19.

It is essential for proper cooperation of the fillings 17 with the depositors 20 and 22 that the fillings should be deposited at the demoulding station B on the band 19 in an orderly array and without change of orientation. This is achieved by the provision of projections 32 on the moulds 15 which contact the upper surface of the band 19 and project from the moulds by an amount less than the depth of the mould cavities. These projections 32 are shown in FIG. 10 assuring orderly deposition of the fillings 17 on the band 19 as described above.

FIGS. 2 – 5 illustrate the moulds, which produce, when inverted and demoulded, cup-shaped fillings 17 of the kind shown in FIGS. 10 – 13. Each mould consists of two halves 12A, 12B disposed end to end in frames 27 and connected at their opposite ends to chains 28 which serve to drive the conveyor 14.

Each mould half consists of a sheet 29 of silicone rubber (upper surface of the mould half) moulded around a metal plate 30 and is formed with apertures which accommodate and support the walls of a plurality of cup-shaped mould cavities 31. Each sheet 29 is formed at one end with a projection 32. The mould halves 12A, 12B are fitted together as shown in FIGS. 4 and 5 and their projections 32 thus extend along the full length of each end of the mould to ensure orderly demoulding and deposition of the fillings on the band 19 as already described.

The metal plate 30 assists in counteracting shrinkage of the silicone rubber during moulding and also prevents one mould cavity 31 from deforming its neighbour during demoulding. The use of the plate, moreover, enables the mould cavities to be placed closer together and for the area of the mould to be more fully utilized.

Figure 6:
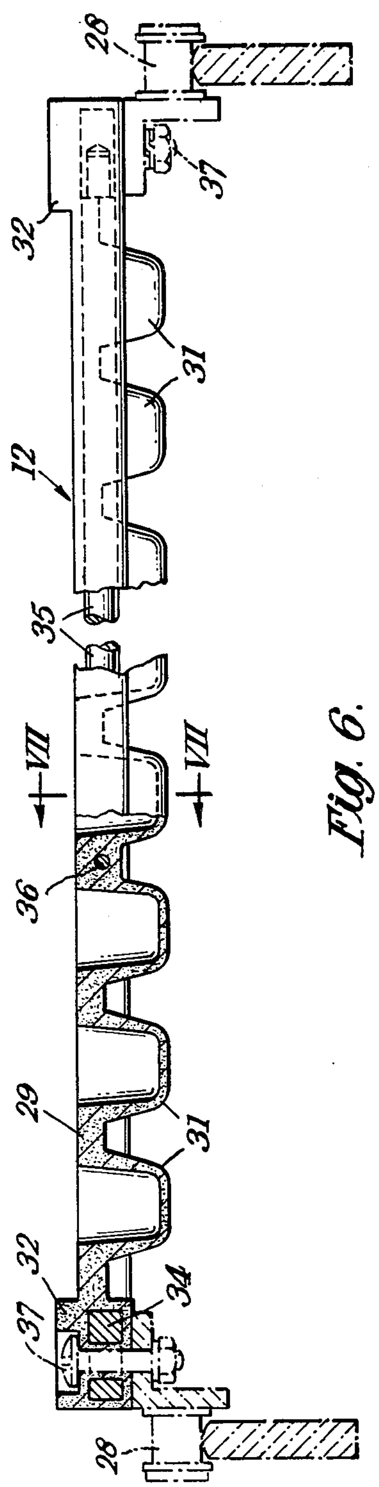
FIG. 6 is a side elevation, partly in section, of an alternative embodiment of mould according to the present invention.
Figure 8:
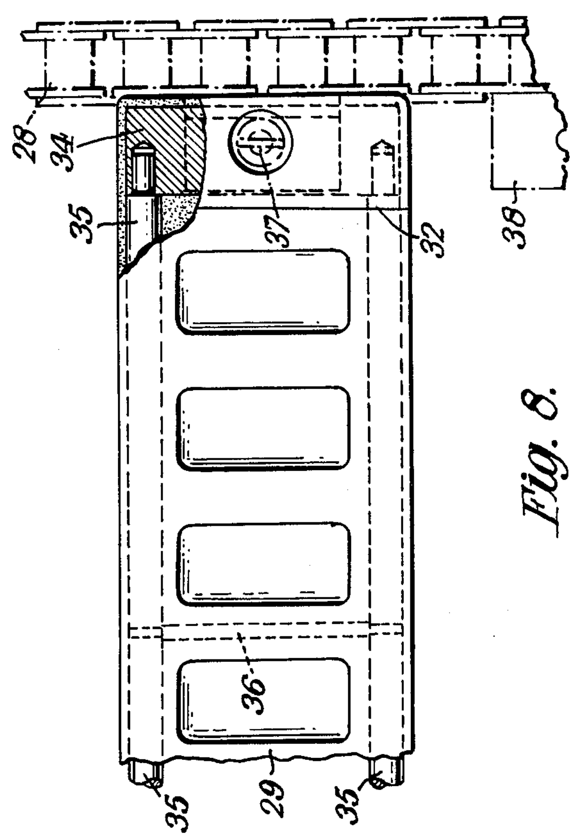
FIG. 8 is a plan view of part of the mould shown in FIG. 6.
Figure 7:
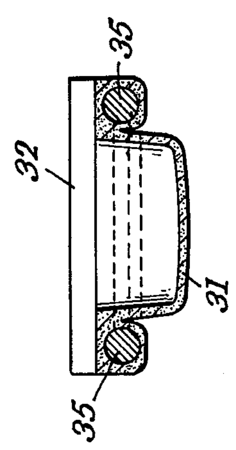
FIG. 7 is a section on the line VII — VII of FIG. 6.

As will be seen, each mould cavity 31 includes a side wall and has a domed base 49 providing a narrow gap between the dome and the inner surface of the side wall of the cavity, and small air escape holes 33 are provided in the rim of the base between the side wall and the dome of each cup-shaped mould cavity 31 to ensure completely filling of the cavities with liquid confectionery at station A. The holes 33 permit air to escape to ensure this, but are too small to allow the liquid confectionery to escape. FIGS. 6 to 8 show an alternative form of mould 12. In this case silicone rubber 29, which forms the mould cavities 31 and the projections 32, is moulded around a steel frame constituted by end members 34, rods 35 and cross wires 36. The end members 35 are connected by bolts 37 to brackets 38 carried by the chains 28. In contrast to FIGS. 2 to 5 the mould cavities have flat bases so that the fillings deposited by these moulds on the band 19 are not cup shaped but they are nevertheless deposited in an orderly array on the band, by cooperation of projections 32 on the mould with the band as previously described, in positions appropriate to the subsequent deposit on them of a nut or a cherry. This is perfectly feasible notwithstanding the fact that the inverted fillings deposited on the band have flat tops.

We claim:

1. A confectionary moulding machine which comprises:

1. an endless mould conveyor which includes a pair of parallel chains and multiple moulds fixed to and straddling the chains; each mould having an upper surface, means forming cavities which have a predetermined depth, and projections which extend away from the upper surface in a direction opposite to the depth of the cavities, the projections extending a distance less than the depth of the cavities; said endless mould conveyor being mounted such that said moulds traverse in a continuous procession along an upper run in which the mould cavities face upwardly and a lower run in which the cavities face downwardly;
2. a depositor disposed above the upper run of the mould conveyor which is operative to deposit fillings of liquid confectionary into the moulds and thus into the cavities as the moulds move in succession along the upper run;
3. a band which is mounted so as to have a run which travels continuously beneath the lower run of the mould conveyor and in the same direction as the lower run of the mould conveyor;
4. a demoulding unit which is operative to discharge the fillings of the cavities of each mould in succession onto the band; and
5. the relative positioning of the lower run of the mould conveyor and the run of the band being such that the projections which extend downwardly from the moulds when the moulds are on the lower run of the mould conveyor contact the surface of the run of the band and constrain the band to move at the same speed as the mould conveyor.

2. A confectionery moulding machine as claimed in claim 1, wherein the means forming each mould cavity includes a side wall and a domed base, the domed base being formed such that a narrow gap exists between the dome and adjacent side wall to thereby define a cavity so that a cup-shaped filling is deposited on the band by the demoulding unit.

3. A machine as claimed in claim 2, wherein each mould cavity has means forming escape holes in the rim of its base.

4. A confectionery moulding machine as claimed in claim 2, which includes a further depositor operable to deposit a filling of confectionery in the cup of each demoulded filling advanced by the band.

5. A confectionery moulding machine as claimed in claim 4 which includes, between the demoulding unit and the further depositor, a depositor for depositing a nut or a cherry in the cup of each demoulded filling.

6. A confectionery moulding machine as claimed in claim 1, which includes a coater operable to coat each demoulded filling on the band with chocolate.

* * * * *